United States Patent [19]
Zierolf

[11] Patent Number: 6,125,318
[45] Date of Patent: Sep. 26, 2000

[54] SLIP RATIO ANTISKID CONTROLLER USING MU/SLIP RATIO GENERATED VELOCITY REFERENCE

[75] Inventor: Michael Lee Zierolf, South Burlington, Vt.

[73] Assignee: The B. F. Goodrich Company, Charlotte, N.C.

[21] Appl. No.: 09/022,988

[22] Filed: Feb. 12, 1998

[51] Int. Cl.[7] .............................. B60B 39/00; B60T 7/12
[52] U.S. Cl. ............................... 701/71; 701/73; 701/82; 701/91; 303/148; 303/150; 303/163
[58] Field of Search .................................. 701/70, 71, 72, 701/73, 78, 79, 81, 82, 91; 303/148, 150, 159, 160, 163, 169

[56] References Cited

U.S. PATENT DOCUMENTS

| | | | |
|---|---|---|---|
| 3,871,715 | 3/1975 | Hikida et al. | 303/172 |
| 4,180,223 | 12/1979 | Amberg | 244/111 |
| 4,323,969 | 4/1982 | Skarvada | 701/75 |
| 4,543,633 | 9/1985 | Cook | 701/78 |
| 4,679,866 | 7/1987 | van Zanten et al. | |
| 4,715,662 | 12/1987 | van Zanten et al. | |
| 4,764,871 | 8/1988 | van Zanten et al. | |
| 4,834,466 | 5/1989 | Arikawa | 303/122.02 |
| 5,050,940 | 9/1991 | Bedford et al. | 303/166 |
| 5,118,168 | 6/1992 | Arikawa | 303/148 |
| 5,180,214 | 1/1993 | Yeh et al. | |
| 5,210,690 | 5/1993 | Kageyama et al. | |
| 5,371,677 | 12/1994 | Ehret et al. | |
| 5,424,942 | 6/1995 | Dong et al. | |
| 5,454,630 | 10/1995 | Zhang | |
| 5,762,407 | 6/1998 | Stacey et al. | 303/155 |
| 5,918,951 | 7/1999 | Rudd, III | 303/150 |

FOREIGN PATENT DOCUMENTS

| | | |
|---|---|---|
| 2695611 | 3/1994 | France . |
| 2701241 | 8/1994 | France . |
| 4329391 | 3/1995 | Germany . |

OTHER PUBLICATIONS

Mark L. Akey, "Fuzzy Logic, Anti–Skid Control for Control for Commercial Trucks"; Magnavox Decision Support Systems Applied Center of Excellence, Fort Wayne, Indiana, SPIE vol. 2493, Mar. 1995, pp. 359–370.

Hutchinson, et al., "Applications of Minimum Variance Reduced–State Estimators", IEEE Transactions on Aerospace and Electronic Systems; Sep. 1975; pp. 785–794.

Du Plessis, "Poor Man's Explanation of Kalman Filtering" Autonetics Division, Rockwell International; date unknown.

Kobayashi, et al., Estimation of Absolute Vehicle Speed Using Fuzzy Logic Rule–Based Kalman Filter Proceedings of the American Control Conference; Jun. 1995.

*Primary Examiner*—William A. Cuchlinski, Jr.
*Assistant Examiner*—Gertrude Arthur
*Attorney, Agent, or Firm*—Mark D. Saralion; David M. Ronyak

[57] ABSTRACT

An antiskid brake controller utilizes measured wheel speed in order to provide brake control for a vehicle such as an aircraft. The controller estimates the speed of the vehicle via approximation based on the measured wheel speed and a model of the mu-slip ratio curve representing the wheel to running surface friction characteristics. The controller then predicts the slip ratio based on the measured wheel speed and estimated vehicle speed. The difference between the predicted slip ratio and a predefined desired slip ratio is used to drive a modified integral controller segment to achieve maximum obtainable friction. In another embodiment, the controller measures and integrates the applied braking torque in order to estimate the vehicle speed. The estimated vehicle speed is again combined with the measured wheel speed to determine an estimated slip ratio. The controller compares the estimated slip ratio with a predefined desired slip ratio which again drives a modified integral controller.

16 Claims, 4 Drawing Sheets

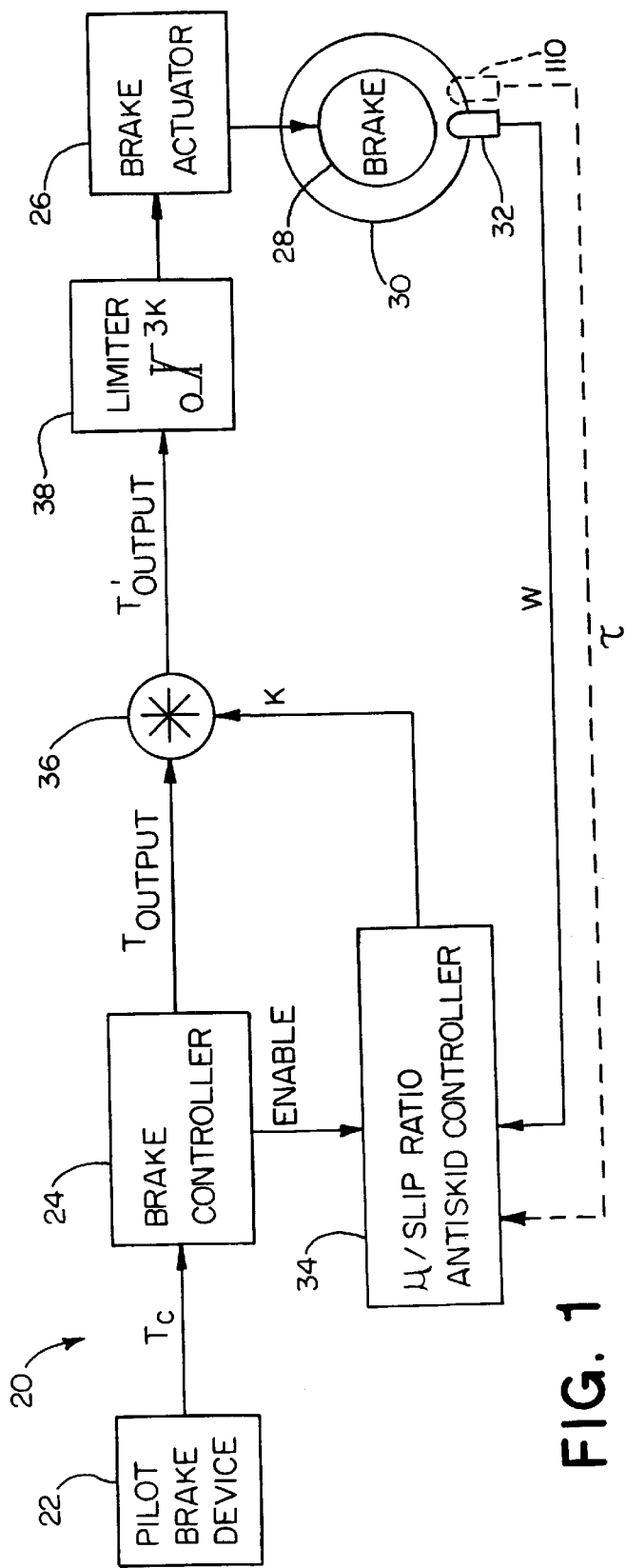
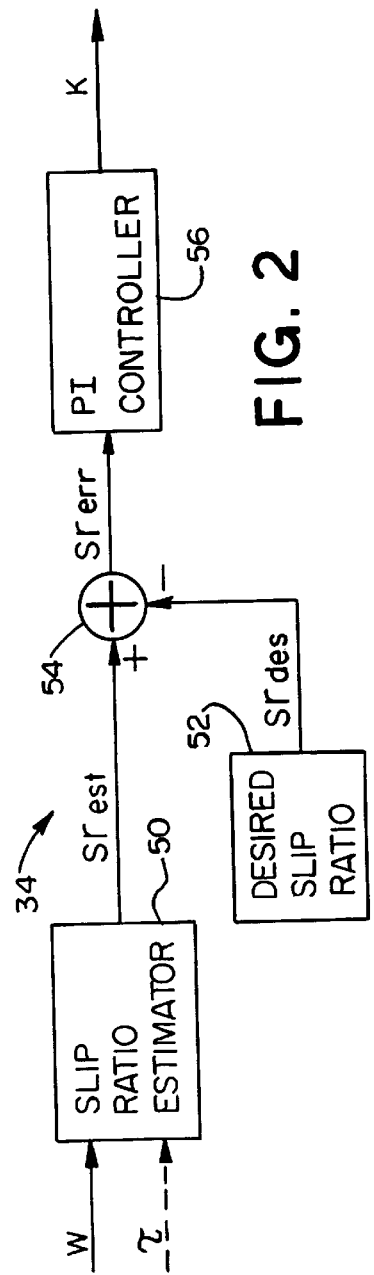
FIG. 1
FIG. 2

SLIP RATIO ANTISKID CONTROLLER USING MU/SLIP RATIO GENERATED VELOCITY REFERENCE

TECHNICAL FIELD

The present invention relates generally to brake control systems, and more particularly to a mu-slip ratio based antiskid brake controller.

BACKGROUND OF THE INVENTION

Antiskid brake controllers have been in widespread use for many years. In the simplest sense, an antiskid brake controller compares the speed of a vehicle (e.g., automobile, aircraft, etc.) derived from a wheel speed sensor to the vehicle speed derived from a secondary or reference source. If the wheel is determined to be slipping an excessive amount (i.e., skidding), then brake pressure applied to the wheel is released and the wheel is allowed to spin back up to the appropriate speed.

A fundamental problem associated with virtually all antiskid brake controllers relates to determining an appropriate amount of slipping. Two types of controllers which are generally known utilize different techniques. The first type of antiskid controller is deceleration based. In short, the deceleration based controller differentiates the wheel speed to determine how fast the wheel speed is changing. If the wheel decelerates too quickly, there is said to be excessive skidding and the controller reduces the amount of pressure transmitted to the brakes.

A second type of antiskid controller relies on a model of the mu-slip curve which describes the tire-to-road surface friction characteristics. The difference between the wheel velocity and the vehicle velocity is referred to as the slip velocity. The slip velocity is compared with a predefined set point on the mu-slip curve in order to achieve a desired amount of slip.

In the case of an aircraft, the antiskid controller is intended to prevent tire skidding during a landing event or during taxi operations. A skidding tire has at least three detrimental effects which are commonly known. For example, drag at the wheel/runway surface interface is lost and the length of the runway needed for the aircraft to stop is increased. Moreover, lateral (or side) wheel friction is reduced during a deep skid, so the ability of the pilot to steer the aircraft is diminished. Finally, tire life is reduced when the wheel skids because patches of rubber are torn from the tire.

A wheel slips (i.e., the rotational speed times the wheel radius is less than the translational speed of the wheel) whenever brake torque is applied to a rotating wheel. The amount of slip determines the drag that is produced at the tire/runway surface interface. There is an optimum amount of slip that generates a maximum tire drag as defined by the well known mu-slip curve. A wheel experiencing slip beyond the optimum amount is considered to be excessively skidding.

Antiskid controllers which are based on the mu-slip curve are oftentimes computationally complex and require multiple sensors for measuring wheel speed, vehicle speed, etc. Consequently, there is a need for an antiskid controller which is not computationally complex and which preferably can provide control with as little as a single measurement sensor. For example, there is a strong need in the art for a mu-slip based antiskid controller capable of providing antiskid control using wheel speed as its only measured parameter.

SUMMARY OF THE INVENTION

In an exemplary embodiment, the antiskid brake controller of the present invention utilizes measured wheel speed in order to provide brake control for a vehicle such as an aircraft. The controller estimates the speed of the vehicle via approximation based on the measured wheel speed and a model of the mu-slip ratio curve representing the wheel to running surface friction characteristics. The controller then predicts the slip ratio based on the measured wheel speed and estimated vehicle speed. The difference between the predicted slip ratio and a predefined desired slip ratio is used to drive a modified integral controller segment to achieve maximum obtainable friction.

In another embodiment, the controller measures and integrates the applied braking torque in order to estimate the vehicle speed. The estimated vehicle speed is again combined with the measured wheel speed to determine an estimated slip ratio. The controller compares the estimated slip ratio with a predefined desired slip ratio which again drives a modified integral controller.

According to one particular aspect of the invention, an antiskid brake controller is provided for controlling a braking operation of a wheel of a vehicle based on a wheel speed signal provided by a wheel speed sensor coupled to the wheel. The controller includes slip ratio estimator configured to estimate a slip ratio between the wheel speed and the speed of the vehicle based on the wheel speed signal provided by the wheel speed sensor; a comparator configured to compare the estimated slip ratio with a predefined desired slip ratio to generate an error signal; and an integral controller configured to integrate the error signal to provide a control signal for adjusting a brake force applied to the wheel.

According to another aspect of the invention, a method is provided for controlling a braking operation of a wheel of a vehicle based on a wheel speed signal provided by a wheel speed sensor coupled to the wheel. The method includes the steps of estimating a slip ratio between the wheel speed and the speed of the vehicle based on the wheel speed signal provided by the wheel speed sensor; comparing the estimated slip ratio with a predefined desired slip ratio to generate an error signal; and integrating the error signal to provide a control signal for adjusting a brake force applied to the wheel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a block diagram of a brake system including a mu-slip ratio based antiskid controller in accordance with the present invention;

FIG. 2 is a simplified block diagram of the mu-slip ratio based antiskid controller shown in FIG. 1;

DESCRIPTION OF THE PREFERRED EMBODIMENTS

Figure 3:
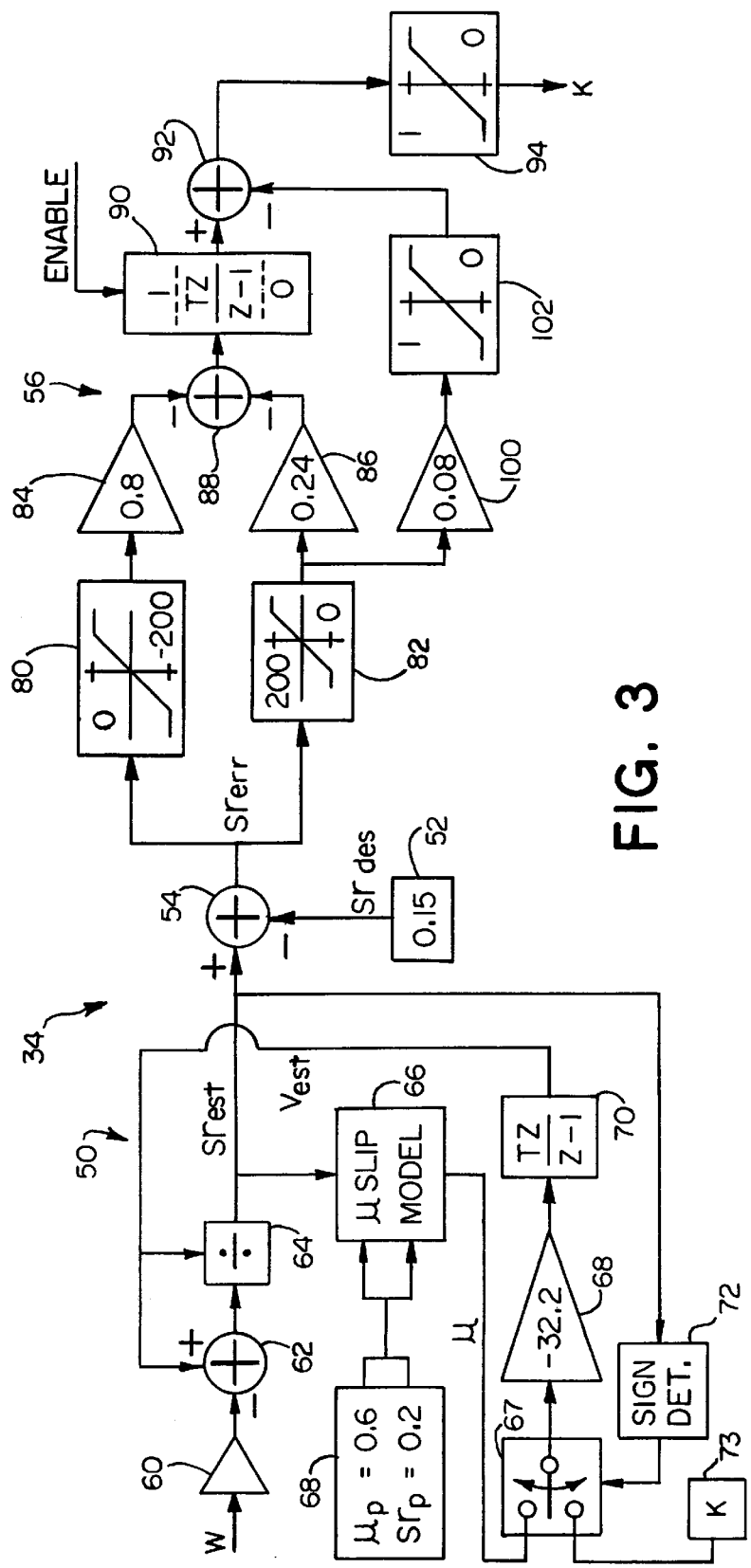
FIG. 3 is a detailed block diagram of the mu-slip ratio based antiskid controller of FIG. 2 according to one embodiment of the present invention.

The present invention will now be described in detail with reference to the drawings, wherein the reference numerals are used to refer to like elements throughout. Referring initially to FIG. 1, a brake control system as used in an aircraft in accordance with the present invention is generally designated 20. Generally speaking, brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair there is a right wheel control and left wheel control. The left and right wheel control functions are uncoupled except for locked wheel protection. The basic unit therefore consists of control of a single wheel which can be left or right. As utilized herein, it will be appreciated that the term "wheel" is intended to refer collectively to both the wheel and tire.

For sake of simplicity, the brake control system 20 as shown in FIG. 1 represents the basic unit for providing brake control of a single wheel (left or right). However, it will be appreciated that control for the other wheel(s) can be provided via corresponding systems 20 or in a single system incorporating the same inventive principles. Moreover, the preferred embodiment of the present invention provides brake control in connection with an aircraft. Nevertheless, it will be appreciated that the brake control system and antiskid controller according to the present invention has utility for virtually any type of vehicle and is not limited necessarily to brake control for aircraft.

The system 20 includes a pilot brake device 22 for providing operator brake control. In addition, the system 20 includes a conventional brake controller 24. The controller 24 is designed to provide a control signal $T_{output}$ to a brake actuator 26 included in the system 20. The brake actuator 26 may be any conventional type actuator (e.g., hydraulic, pneumatic or electromechanical) for applying pressure to the brake material (not shown) in a brake assembly 28. The brake assembly 28 in turn provides braking action to a wheel 30 by exerting a braking torque or force on the wheel 30 as is conventional. The wheel 30 is coupled to the aircraft (or other vehicle) via a conventional structure (not shown).

The system 20 further includes a wheel speed sensor 32 which measures the angular velocity or rotational speed of the wheel 30. The wheel speed sensor 32 may be any conventional sensor (e.g., optical encoder based, etc.) which provides an output signal ω indicative of the measured speed of the wheel 30.

The signal ω is input to a mu-slip ratio based antiskid controller 34 included in the system 20. As will be discussed in detail below in connection with the embodiment of FIG. 3, for each sample period the controller 34 estimates the slip ratio based on the measured wheel speed ω and a model of the mu-slip ratio curve. The controller 34 uses the estimated slip ratio to predict the velocity of the aircraft, and the predicted velocity is then fed back to the mu-slip ratio model in order to estimate the slip ratio for the next sample period.

The estimated slip ratio is compared within the controller 34 to a predefined desired slip ratio to generate an error signal. The controller utilizes the error signal to drive a discrete limited integrator controller segment included therein. Based on the comparison, the controller 34 outputs a control signal "k" which varies in value from 0 to 1. The control signal k is output by the controller 34 to a multiplier 36 which multiplies the brake control signal $T_{output}$ by the value of k. The resultant modified brake control signal $T_{output}'$ is output by the multiplier 36 to a limiter 38 and then to the brake actuator 26. The brake actuator 26 consequently applies a braking force to the wheel 30 based on the modified brake control signal $T_{output}'$. The limiter 38 serves to limit the maximum modified brake control signal $T_{output}'$ so as to avoid damage to the brake actuator 26 and/or the brake assembly 28. As will be described more fully below in relation to FIGS. 2–4, the controller 34 effectively reduces the pilot pressure applied to the brake assembly 28 if the wheel 30 experiences slip which exceeds a predefined desired amount. Such reduction is carried out by the controller 34 by way of varying the value of k.

Generally describing the operation of the system 20, the pilot brake device 22 comprises a pedal or equivalent thereof. During a braking event, the pilot of the aircraft activates the pilot brake device 22 by pushing the pedal (or its equivalent). The depression of the pedal is converted to an electrical signal (brake torque command signal $T_c$) which is provided to the controller 34. The value of the command signal $T_c$ is indicative of the degree of depression of the pedal, and is related to the amount of braking force requested by the pilot as is conventional. The controller 34 receives the command signal $T_c$ and outputs the brake control signal $T_{output}$ which is related to the command signal $T_c$. It will be appreciated that the control signal $T_{output}$ will be a pressure signal for a hydraulic brake or a force signal for an electric brake, for example. The control signal $T_{output}$ is provided to one input of the multiplier 36 which multiplies the control signal by the signal k provided by the controller 34 to the other input.

Figure 4:
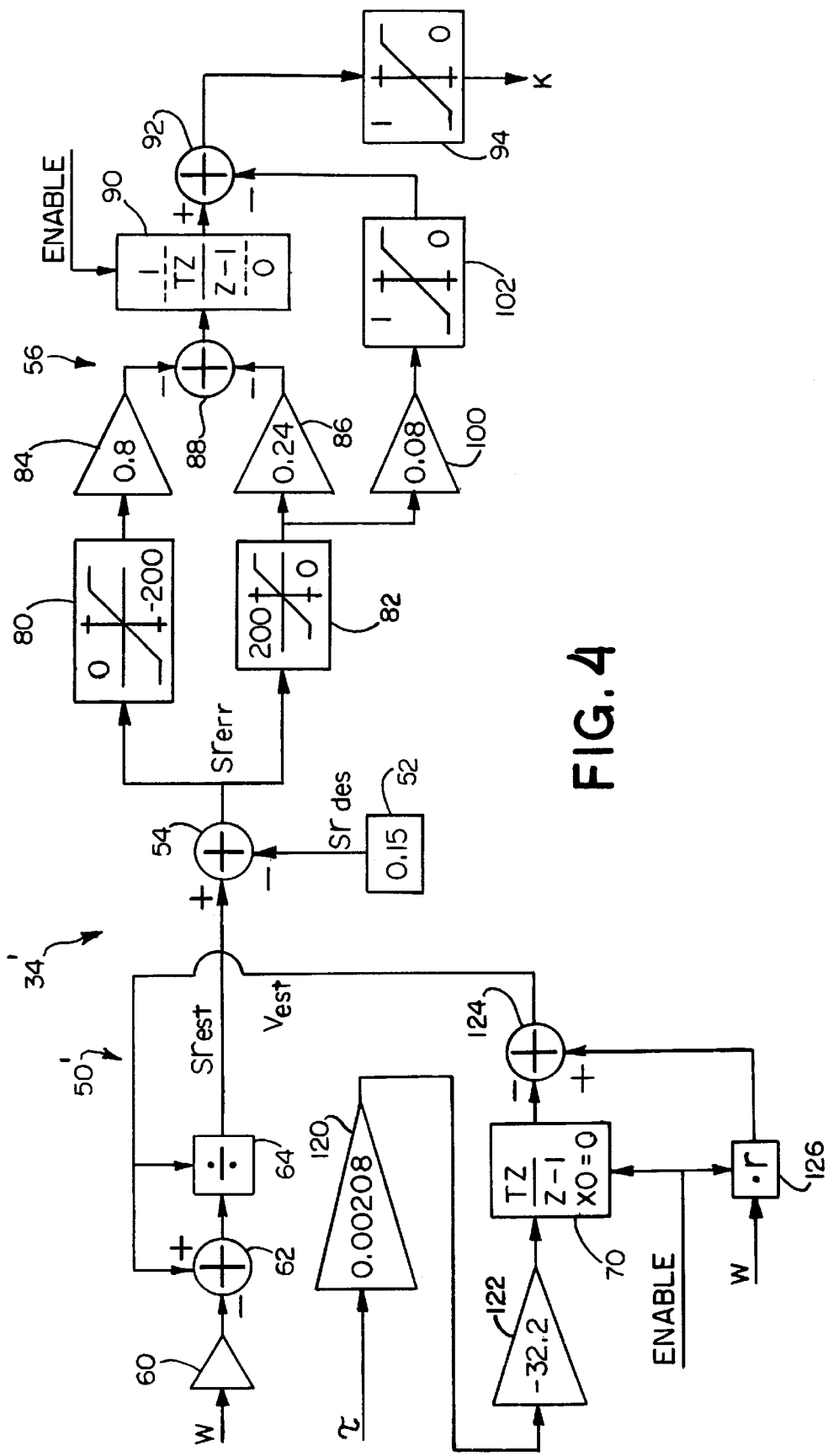
FIG. 4 is a detailed block diagram of the mu-slip ratio based antiskid controller of FIG. 2 according to another embodiment of the present invention.

As mentioned above, the modified control signal $T_{output}'$ is limited by the limiter 38 prior to being input to the brake actuator 26. The brake actuator 26 in turn applies pressure to the brake assembly 28 based on the modified control signal $T_{output}'$ in an otherwise conventional manner. The applied brake pressure results in a reduction in the rotational speed of the wheel 30 which is measured by the wheel speed sensor 32 and fed back to the controller 34. Thus, the present invention provides closed loop brake control based on the mu-slip ratio. In the exemplary embodiment the only input parameter is wheel speed, thus eliminating the need for additional sensors which add to complexity and cost. In the embodiment of FIG. 4, applied brake torque may also be utilized as will be described.

Referring now to FIG. 2, a simplified block diagram of the antiskid controller 34 is shown. As will be appreciated, the controller 34 in the exemplary embodiment is a digital controller represented in FIGS. 3 and 4 as operating in the z-domain. The measured wheel speed signal ω from the sensor 32 is sampled at a rate of 800 samples per second, although clearly other sampling rates could be used. Moreover, other digital or analog control techniques are possible and the precise implementation described herein should not be construed as limiting in scope.

The controller 34 includes a slip ratio estimator 50 which receives as an input the measured wheel speed ω from the sensor 32. As will be discussed in more detail with respect to the embodiment of FIG. 3 below, the estimator 50 outputs a signal $sr_{est}$ representing the estimated slip ratio based on a mu-slip ratio model included therein. The controller 34 further includes a register 52 which contains a predefined desired slip ratio $sr_{des}$. The desired slip ratio $sr_{des}$ is preselected based on a priori knowledge. For example, it is known that the optimal slip ratio for an aircraft wheel on a runway surface will be between 0.1 and 0.2.

The values of $sr_{est}$ and $sr_{des}$ are input to positive and negative inputs, respectively, of an adder 54. The adder 54 compares the estimated slip ratio $sr_{est}$ with the desired slip ratio $sr_{des}$ and outputs an error signal $sr_{err}$ representing the difference therebetween. The error signal $sr_{err}$ is input to an asymmetric proportional-integral (PI) controller segment 56 which is described in more detail below. The error signal $sr_{err}$ drives the PI controller segment 56, which in turn outputs the control signal k.

Technical Theory:

The operation of the controller 34 in the embodiment of FIG. 3, and more particularly the slip ratio estimator 50, will be better understood in view of the following. Assuming that the velocity of the aircraft has been obtained (e.g., via approximation as described below), the slip ratio may be estimated as follows:

$$sr_{est} = \frac{v_{est} - \omega \cdot r}{v_{est}} \quad (1)$$

where $sr_{est}$ is the estimated slip ratio, $v_{est}$ is the estimated aircraft velocity, r is the rolling radius of the wheel 30, and $\omega$ is the angular or rotational velocity of the wheel 30.

The first step of the controller 34 is to approximate the friction $\mu$ at the interface between the wheel 30 and the runway surface, and then to estimate the aircraft velocity using the approximated value of $\mu$. The relationship between slip ratio and friction has been studied in dynamometer tests, and one simple mu-slip ratio model is given as:

$$\mu = 2 \cdot \mu_p \cdot \frac{\frac{sr_{est}}{sr_p}}{1 + \left(\frac{sr_{est}}{sr_p}\right)^2} \quad (2)$$

where $\mu$ represents friction, $\mu_p$ is the peak friction, $sr_p$ is the slip ratio at peak friction $u_p$, and $sr_{est}$ is the estimated slip ratio. The parameters $\mu_p$ and $sr_p$ depend on the runway surface conditions (e.g., an icy surface has a lower $\mu_p$ than a dry surface). Ignoring external drag forces (e.g., air brakes), the deceleration of the aircraft (for a single wheel aircraft) is directly proportional to $\mu$ and gravity g. Thus, the velocity of the aircraft $v_{est}$ may be estimated by using the approximate $\mu$ found by equations (1) and (2), and by setting the initial condition of an integrator to which $\mu$ is input equal to the initial wheel speed $\omega$ measured at the beginning of a braking event times the wheel rolling radius r. The estimated aircraft velocity $v_{est}$ may then be fed back into the mu-slip ratio model in equation (2) for the next sample period.

The particular values of $\mu_p$ and $sr_p$ preferably are preselected for maximum deceleration. In the case of an aircraft, the values of $\mu_p$ and $sr_p$ are predetermined for maximum aircraft deceleration, e.g., 0.6 and 0.2 respectively. Such values are based on a priori knowledge, although other values may be chosen without departing from the intended scope of the invention. By selecting the values of $\mu_p$ and $sr_p$ for maximum deceleration, the controller 34 will always conclude that there is less slip than there is in actuality. In other words, the estimated velocity $v_{est}$ is always less than the true velocity. Hence, the wheel 30 will start to skid. As the controller 34 recovers from the skid, the aircraft velocity estimate $v_{est}$ is reset when the wheel spins back up. In this manner, the controller 34 can "ride" the peak of the mu-slip curve.

Turning now to FIG. 3, an embodiment of the controller 34 for carrying out the operation described above is shown. The measured wheel speed $\omega$ is input to a linear amplifier 60 included in the slip ratio estimator 50. The gain of the amplifier 60 is preset to the rolling radius r of the wheel 30, and thus the output of the amplifier 60 represents the translational velocity of the wheel 30 ($\omega \cdot r$). The output of the amplifier 60 is provided to a negative input of an adder 62. The adder 62 sums the amplifier output with the estimated aircraft velocity $v_{est}$ which is received at the other input of the adder 62. The output of the adder 62 is input to a divider 64 which divides the adder 62 output by the estimated aircraft velocity $v_{est}$ received at the other input of the divider 64. Consequently, the output of the divider 64 represents the estimated slip ratio $sr_{est}$ based on the measured wheel speed $\omega$ and the estimated aircraft velocity $v_{est}$ as given by Equ. 1 above.

The estimated slip ratio $sr_{est}$ is input to a mu-slip ratio model block 66 which is configured to estimate the value of friction $\mu$ using the model represented in Equ. 2 above, for example. Also input to the model block 66 are the predefined values for the peak friction $\mu_p$ and the slip ratio $sr_p$ at the peak friction $u_p$. In the exemplary embodiment for the case of an aircraft, the values of $\mu_p$ and $sr_p$ are predetermined for maximum aircraft deceleration, e.g., 0.6 and 0.2 respectively, as previously noted above. Such values are stored in a register 68 and are input to the model block 66 as shown in FIG. 3. The model block 66 computes the friction value $\mu$ based on the current value of $sr_{est}$ and the values of $\mu_p$ and $sr_p$ using Equ. 2 given above. However, it will be appreciated that another model of the mu-slip ratio curve could also be used without departing from the scope of the invention.

For each sampling interval, the model block 66 outputs the calculated value of $\mu$ to one terminal of a switch 67. The pole of the switch 67 is coupled to the input of an amplifier 68. Under normal braking conditions, as discussed below, the value of $\mu$ from the model block 66 is input to the amplifier 68 via the switch 67. The gain of the amplifier 68 is set to represent g (acceleration due to gravity, e.g., 32.2 feet/second$^2$). The output of the amplifier 68 is provided to the input of an integrator block 70. The integrator block 70 has a transfer function of $Tz/(z-1)$, where T represents the sampling period. As is explained above, the value of $\mu$ times the acceleration of gravity g when integrated represents the estimated aircraft velocity $v_{est}$. Accordingly, the integrator block 70 provides as its output the estimated aircraft velocity $v_{est}$. The estimated aircraft velocity $v_{est}$ is then fed back to the adder 62 and the divider 64 so as to be used in computer the estimated slip ratio $sr_{est}$ and $\mu$ in the next sampling interval.

The integrator block 70 receives as an input an ENABLE signal provided from the brake controller 24 (FIG. 1). The ENABLE signal is designed to go active at the initiation of a braking event as determined, for example, based on the command signal $T_c$ provided by the pilot brake device 22. Upon the ENABLE signal initially going active, the integrator block 70 is designed to initialize its output so as to equal the initial wheel speed $\omega$ measured at the beginning of the braking event times the wheel rolling radius r. As a result, $v_{est}$ at the beginning of a braking event is set equal to the initial translational velocity of the wheel 30.

Furthermore, a sign detector block 72 is included in the slip ratio estimator 50 for reinitializing the integrator block 70. The sign detector block 72 receives as an input the estimated slip ratio $sr_{est}$. The output of the sign detector block 72 controls the position of the switch 67 as follows. For such time that the value of $sr_{est}$ is negative (i.e., <0), the sign detector block 72 causes a predetermined constant K to be input to the amplifier 68 and integrator block 70 via the switch 67 in lieu of the value of $\mu$. Otherwise, for such time that the value of $sr_{est}$ is equal to or greater than 0, the value of $\mu$ from the model block 66 serves as the input to the amplifier 68 and integrator block 70.

Since the estimated slip ratio $sr_{est}$ will be negative only if the wheel speed is greater than the velocity of the aircraft (Equ. 1), and since such an occurrence would not be possible as a practical matter, the slip ratio estimator 50 uses such information to reinitialize itself. Specifically, a predetermined constant K from a register 73 is input to the amplifier 68 during such time that the estimated slip ratio $sr_{est}$ remains negative. The value of K is selected so as to cause the estimated velocity $v_{est}$ output by the integrator block 70 to increase.

The slip ratio estimator 50 further includes the register 52 which stores the predetermined desired slip ratio $sr_{des}$. In the exemplary embodiment, a value of 0.15 is selected for $sr_{des}$ although other values may be used depending on the particular application. The desired slip ratio $sr_{des}$ is provided to a negative input of the aforementioned adder 54, and the estimated slip ratio $sr_{est}$ from the divider 64 is provided to a positive input. Consequently, the adder 54 ouputs the error signal $sr_{err}$ to the PI controller 56.

More specifically, the error signal $sr_{err}$ is input to a limiter block 80 and a limiter block 82. The limiter block 80 has a range from 0 to –200, for example, and the limiter block 82 has a range from 0 to 200. The limits 200 and –200 are arbitrary limits used in determining the sign of $sr_{err}$ and allow only positive signals and negative signals through in the respective legs of the controller 56. The output of the limiter block 80 is provided to an "increase pressure" integral gain amplifier 84. The output of the limiter block 82 is provided to a "decrease pressure" integral gain amplifier 86. The outputs of the amplifiers 84 and 86 are in turn provided to respective negative inputs of an adder 88. The output of the adder 88 is provided to an integrator block 90 also having a transfer function of Tz/(z–1). The integrator block 90 has a limited output which ranges between the values of 0 and 1, and is initiallized to 1 at the beginning of each braking event based on the ENABLE signal.

The output of the integrator block 90 is provided to a positive input of an adder 92. The adder 92 combines the output of the integrator block 90 with the output of a proportional leg of the controller 56 described below. The output of the adder 92 is input to a limiter block 94 having a range of 0 to 1, and the output of the limiter block 94 represents the control signal k provided to the multiplier 36 (FIG. 1).

During a braking event, if the estimated slip ratio $sr_{est}$ is less than the desired slip ratio $sr_{des}$, the value of $sr_{err}$ will be negative. As a result, $sr_{err}$ is output through the limiter block 80 to the amplifier 84. The output of the amplifier 84 results in a positive output from the adder 88 to the integrator block 90. Thus, the output of the integrator block 90 will increase. The increase will cause the value of k output from the limiter block 94 to tend to increase, resulting in an increase in the applied brake pressure. As will be appreciated, the output of the integrator block 90 will increase at a rate determined by the range of the limiter block 80 and the gain of the amplifier 84. In the exemplary embodiment, the gain of the amplifier 84 is set to 0.8, although another value may be used in a different embodiment.

If, during a braking event, the estimated slip ratio $sr_{est}$ is instead greater than the desired slip ratio $sr_{des}$, the value of $sr_{err}$ will be positive. As a result, $sr_{err}$ is output through the limiter block 82 to the amplifier 86. The output of the amplifier 86 results in a negative output from the adder 88 to the integrator block 90. In such case, the output of the integrator block 90 will tend to decrease. The decrease will cause the value of k output from the limiter block 94 to also tend to decrease, resulting in a decrease in the applied brake pressure. As will be appreciated, the output of the integrator block 90 will decrease at a rate determined by the range of the limiter block 82 and the gain of the amplifier 86. In the exemplary embodiment, the gain of the amplifier 86 is set to 0.24, although another value may be used in a different embodiment.

The output of the limiter block 82 is also connected to the input of an amplifier 100 having its output connected to another limiter block 102. The amplifier 100 and limiter block 102 represent a "decrease pressure" proportional leg of the controller. In the event the $sr_{est}$ is greater than the desired slip ratio $sr_{des}$, the output of the limiter block 82 is also amplified through the amplifier 100. The output of the amplifier 100 is input to the limiter block 102 having a range of 0 to 1, and the output of the limiter block 102 is provided to a negative input of the adder 92. This proportional component serves to reduce the value of k otherwise provided by the integral leg of the controller in order to reduce brake pressure more quickly. In the exemplary embodiment, the gain of amplifier 100 is set to 0.08, although some other value may be used in another embodiment.

Accordingly, the value of k is modified based on the estimated slip ratio so as to control the amount of brake pressure applied during a braking event. FIG. 4 represents another embodiment of the mu-slip ratio based controller, in this case designated by 34'. Many of the components found in the embodiment of FIG. 3 are similar to those in FIG. 4 and are designated by like reference numerals. Accordingly, only the differences between the embodiments will be described for sake of brevity.

In the embodiment of FIG. 4, the slip ratio estimator 50' is modified so as to estimate the aircraft velocity based on the amount of brake torque applied to the wheel 30. As shown in phantom in FIG. 1, the system 20 in this particular embodiment further includes a torque sensor 110 for measuring the amount of brake torque T applied to the wheel 30. The output of the sensor 110 is input to the mu-slip ratio based controller 34' along with the measured wheel speed ω. The slip ratio estimator 50' of FIG. 4 differs from the slip ratio estimator 50 primarily by the inclusion of a torque integrator in place of the mu-slip ratio model. The torque integrator is used to estimate the aircraft velocity as will be discussed below.

Technical Theory:

The aircraft velocity and wheel system primary dynamics may be defined as follows:

$$v' = g \cdot \mu(\ ) \quad (3)$$

$$I\_\omega' = \mu(\ ) \cdot W \cdot r - T \quad (4)$$

where v is the aircraft velocity, g is gravity, $\mu(\ )$ is developed wheel to surface friction, I is the wheel inertia, ω is the angular speed of the wheel, W is the aircraft weight, r is the rolling radius, T is the applied brake torque, and "'" denotes the time derivative. Rearranging Equ. 3 to solve for $\mu(\ )$ and substituting into Equ. 4, one obtains $$I\_\omega'=(v'/g)\cdot W\cdot r - T \qquad (5)$$

Solving Equ. 5 for v' and integrating both sides of the equation yields $$v(t) = v(0) + \frac{I\cdot g}{W\cdot r}(\omega(t) - \omega(0)) - \frac{g}{W\cdot r}\int_0^t \tau\, dt \qquad (6)$$

In general, the last term in Equ. 6 dominates as the integral torque is much larger than the value of ($\omega(t)-\omega(0)$). Therefore, $$v(t) \approx v(0) - \frac{g}{W\cdot r}\int_0^t \tau\, dt \qquad (7)$$

Thus, the velocity of the aircraft may be estimated using the integral of the measured torque T in accordance with Equ. 7. Of course, such estimate requires knowledge of the g/W·r term. In the exemplary embodiment, the g/W·r term is predetermined based on the known value of the aircraft weight W and the wheel rolling radius r. According to one example, the term is calculated to be 0.00208 g based on a predetermined aircraft weight of W=13,800 lbf and a rolling radius r=1.12 ft.

The estimated aircraft velocity $v_{est}$ is computed in the embodiment of FIG. 4 based on the integrated torque rather than the mu-slip ratio model as in the embodiment of FIG. 3. Using the principles of Equ. 7, the measured torque T from the sensor 110 is input to an amplifier 120 as shown in FIG. 4. The gain of the amplifier 120 is preset to 0.00208 corresponding to the predetermined value of the aforementioned g/W$\omega$r term. The output of the amplifier 120 is input to a second amplifier 122 having a gain set to the value of g. Hence, the term (g/W$\omega$r)$\omega$T is then input to the integrator block 70.

The integrator block 70 performs the integration represented in Equ. 7. The output of the integrator block 70 is provided to a negative input of an adder 124. A positive input of the adder 124 receives the output of an initial condition block 126. The value of the signal provided from the initial condition block 126 is set equal to the term v(0), or the velocity of the aircraft at the beginning of the braking event. The initial condition block 126 is configured to compute such value based on the measured wheel speed $\omega$ times the rolling radius r following spin up and immediately preceding the braking event.

Accordingly, the output of the adder 124 represents the estimated aircraft velocity $v_{est}$. This value is fed back to the adder 62 and divider 64 similar to the embodiment of FIG. 3. The estimated slip ratio $sr_{est}$ is again output from the divider 64, and is compared with the desired slip ratio $sr_{des}$ by the adder 54 in the same manner as discussed above. Thereafter, the error signal $sr_{err}$ thus generated is input to the PI controller 56 and is processed in the same manner discussed above in relation to the embodiment of FIG. 3. As a result, control is again provided based on the mu-slip ratio.

Figure 5:
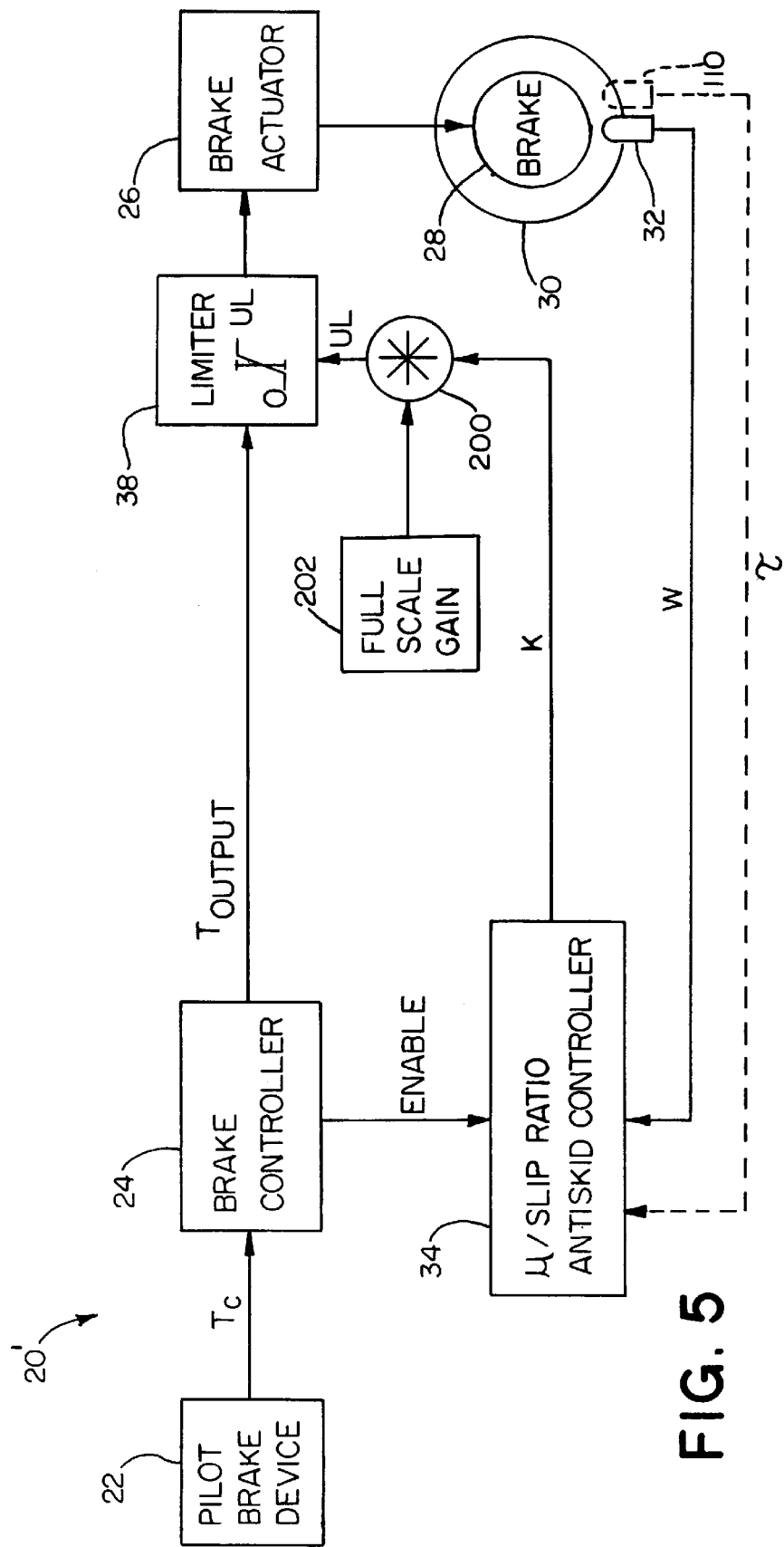
FIG. 5 is a block diagram of a brake system in accordance with another embodiment of the present invention.

Referring briefly to FIG. 5, another embodiment of the brake control system, denote 20', is shown in accordance with the present invention. In this embodiment, the control signal k adjusts the brake force applied to the wheel by controlling the limits of the limiter 38 rather than by directly scaling the brake control signal $T_{output}$ as in the embodiment of FIG. 1.

More specifically, the control signal k from the controller 34 is input to a multiplier 200. The multiplier 200 receives at its other input the nominal upper limit for the limiter 38, as represented by a full scale gain block 202. In the embodiment of FIG. 1, such full scale gain or upper limit was 3000, for example, and such value may be input to the multiplier 200 from block 202. The multiplier 200 scales the full gain value by the factor k to produce an upper limit (UL) output signal which is input to the limiter 38. The limiter 38 is designed to use as its upper limit the current value of UL as provided by the multiplier 200.

Accordingly, as the value of k varies from zero to one as described above, the maximum brake control signal which is passed on to the brake actuator 26 is controlled. It has been found that control of the upper limit of the limiter 38 based on the value of k provides smooth antiskid control.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An antiskid brake controller for controlling a braking operation of a wheel of a vehicle based on a wheel speed signal provided by a wheel speed sensor coupled to the wheel, the controller comprising:

slip ratio estimator means for estimating a speed of the vehicle and a slip ratio between the wheel speed and the speed of the vehicle based substantially exclusively on the wheel speed signal provided by the wheel speed sensor and a predefined model of a mu-slip ratio curve;

means for comparing the estimated slip ratio with a predefined desired slip ratio to generate an error signal; and integral controller means for integrating the error signal to provide a control signal for adjusting a brake force applied to the wheel.

2. The controller of claim 1, wherein the control signal functions to decrease the brake force applied to the wheel at a rate which is greater than a rate at which the control signal increases the brake force applied to the wheel.

3. The controller of claim 1, wherein the slip ratio estimator means estimates the slip ratio based on the measured wheel speed and a previously estimated speed of the vehicle.

4. The controller of claim 1, wherein the vehicle is an aircraft.

5. An antiskid brake controller for controlling a braking operation of a wheel of a vehicle based on a wheel speed signal provided by a wheel speed sensor coupled to the wheel, the controller comprising:

slip ratio estimator means for estimating a slip ratio between the wheel speed and the speed of the vehicle based on the wheel speed signal provided by the wheel speed sensor;

means for comparing the estimated slip ratio with a predefined desired slip ratio to generate an error signal; and integral controller means for integrating the error signal to provide a control signal for adjusting a brake force applied to the wheel, wherein the slip ratio estimator means includes a predefined model of a mu-slip ratio curve for estimating the slip ratio and utilizes the model to estimate the speed of the vehicle, and the model can be generally represented by:

$$\mu = 2 \cdot \mu_p \cdot \frac{\frac{sr_{est}}{sr_p}}{1 + \left(\frac{sr_{est}}{sr_p}\right)^2}$$

where $\mu$ represents friction between the wheel and a running surface, $\mu_p$ is the peak friction, $sr_p$ is the slip ratio at peak friction $u_p$, and $sr_{est}$ is the estimated slip ratio.

6. An antiskid brake controller for controlling a braking operation of a wheel of a vehicle based on a wheel speed signal provided by a wheel speed sensor coupled to the wheel, the controller comprising:

slip ratio estimator configured to estimate a speed of the vehicle and a slip ratio between the wheel speed and the speed of the vehicle based substantially exclusively on the wheel speed signal provided by the wheel speed sensor and a predefined model of a mu-slip ratio curve;

a comparator configured to compare the estimated slip ratio with a predefined desired slip ratio to generate an error signal; and an integral controller configured to integrate the error signal to provide a control signal for adjusting a brake force applied to the wheel.

7. The controller of claim 6, wherein the control signal functions to decrease the brake force applied to the wheel at a rate which is greater than a rate at which the control signal increases the brake force applied to the wheel.

8. The controller of claim 6, wherein the slip ratio estimator estimates the slip ratio based on the measured wheel speed and a previously estimated speed of the vehicle.

9. The controller of claim 6, wherein the vehicle is an aircraft.

10. An antiskid brake controller for controlling a braking operation of a wheel of a vehicle based on a wheel speed signal provided by a wheel speed sensor coupled to the wheel, the controller comprising:

slip ratio estimator configured to estimate a slip ratio between the wheel speed and the speed of the vehicle based on the wheel speed signal provided by the wheel speed sensor;

a comparator configured to compare the estimated slip ratio with a predefined desired slip ratio to generate an error signal; and an integral controller configured to integrate the error signal to provide a control signal for adjusting a brake force applied to the wheel, wherein the slip ratio estimator includes a predefined model of a mu-slip ratio curve for estimating the slip ratio and utilizes the model to estimate the speed of the vehicle, and the model can be generally represented by:

$$\mu = 2 \cdot \mu_p \cdot \frac{\frac{sr_{est}}{sr_p}}{1 + \left(\frac{sr_{est}}{sr_p}\right)^2}$$

where $\mu$ represents friction between the wheel and a running surface, $\mu_p$ is the peak friction, $sr_p$ is the slip ratio at peak friction $u_p$, and $sr_{est}$ is the estimated slip ratio.

11. A method for controlling a braking operation of a wheel of a vehicle based on a wheel speed signal provided by a wheel speed sensor coupled to the wheel, the method comprising the steps of:

estimating a speed of the vehicle and a slip ratio between the wheel speed and the speed of the vehicle based substantially exclusively on the wheel speed signal provided by the wheel speed sensor and a predefined model of a mu-slip ratio curve;

comparing the estimated slip ratio with a predefined desired slip ratio to generate an error signal; and integrating the error signal to provide a control signal for adjusting a brake force applied to the wheel.

12. The method of claim 11, wherein the control signal functions to decrease the brake force applied to the wheel at a rate which is greater than a rate at which the control signal increases the brake force applied to the wheel.

13. The method of claim 1, wherein the slip ratio is estimated based on the measured wheel speed and a previously estimated speed of the vehicle.

14. The method of claim 11, wherein the vehicle is an aircraft.

15. A method for controlling a braking operation of a wheel of a vehicle based on a wheel speed signal provided by a wheel speed sensor coupled to the wheel, the method comprising the steps of:

estimating a slip ratio between the wheel speed and the speed of the vehicle based on the wheel speed signal provided by the wheel speed sensor;

comparing the estimated slip ratio with a predefined desired slip ratio to generate an error signal; and integrating the error signal to provide a control signal for adjusting a brake force applied to the wheel, wherein the estimating step involves the use of a predefined model of a mu-slip ratio curve to estimate the slip ratio and utilizing the model to estimate the speed of the vehicle, and the model can be generally represented by:

$$\mu = 2 \cdot \mu_p \cdot \frac{\frac{sr_{est}}{sr_p}}{1 + \left(\frac{sr_{est}}{sr_p}\right)^2}$$

where $\mu$ represents friction between the wheel and a running surface, $\mu_p$ is the peak friction, $sr_p$ is the slip ratio at peak friction $u_p$, and $sr_{est}$ is the estimated slip ratio.

16. An antiskid brake controller for controlling a braking operation of a wheel of a vehicle based on a wheel speed signal provided by a wheel speed sensor coupled to the wheel and a brake torque signal provided by a brake torque sensor indicative of an amount of brake torque applied to the wheel, the controller comprising:

a circuit for receiving and integrating the brake torque signal with respect to time to produce an estimated vehicle speed signal;

a slip ratio estimator circuit for estimating a slip ratio between the wheel speed and the speed of the vehicle based on a combination of the wheel speed signal provided by the wheel speed sensor and the estimated vehicle speed signal;

a comparator circuit for comparing the estimated slip ratio with a predefined desired slip ratio to generate an error signal; and an integrator circuit for integrating the error signal to provide a control signal for adjusting a brake force applied to the wheel.

* * * * *